United States Patent [19]

Kagawa et al.

[11] Patent Number: 4,716,184

[45] Date of Patent: Dec. 29, 1987

[54] EPOXY RESIN ENCAPSULATING COMPOSITION WITH ENHANCED MOISTURE RESISTANCE AND METHOD FOR PRODUCING THE SAME

[75] Inventors: Hirohiko Kagawa; Yasuhiro Kyotani; Munetomo Torii, all of Kadoma, Japan

[73] Assignee: Matsushita Electric Works, Ltd., Japan

[21] Appl. No.: 937,331

[22] Filed: Dec. 3, 1986

[51] Int. Cl.$^4$ ................................................ C08F 6/28
[52] U.S. Cl. .................................... 523/310; 523/410; 523/460; 524/408; 524/409; 528/482
[58] Field of Search ........................ 523/410, 460, 310; 524/408, 409; 528/482

[56] References Cited

U.S. PATENT DOCUMENTS

| | | | |
|---|---|---|---|
| 4,041,550 | 8/1977 | Tuller et al. | 260/280 P |
| 4,152,689 | 5/1979 | Thompson | 338/254 |
| 4,177,343 | 12/1979 | Pannell | 528/482 |
| 4,248,920 | 2/1981 | Yoshizumi et al. | 428/76 |
| 4,287,105 | 9/1981 | Rosler et al. | 260/18 EP |

FOREIGN PATENT DOCUMENTS

| | | |
|---|---|---|
| 0176237 | 10/1983 | Japan . |
| 0238319 | 11/1985 | Japan . |
| 1163923 | 7/1986 | Japan . |
| 0172324 | 5/1985 | European Pat. Off. . |

Primary Examiner—Joseph L. Schofer
Assistant Examiner—Angela L. Fugo

Attorney, Agent, or Firm—Stevens, Davis, Miller & Mosher

[57] ABSTRACT

An epoxy resin encapsulating composition for semiconductor packages consisting essentially of an epoxy resin adduct of epichlorohydrin and an aromatic hydroxyl-containing compound, and an inorganic ion-exchange solid material admixed with the epoxy resin adduct. The ion-exchange solid material is selected to have the capability of exchanging its mobile anions with the undesired chlorine ions which occur inherently in the package made from the encapsulating composition and are very likely to corrode the metallic conductor on the semiconductor to be encapsulated. The ion-exchange solid material is characterized to include antimony and bismuth as basic materials forming an ion-exchange network which carries the mobile anions to be substituted with the chlorine ions. This ion-exchange material also is found to be also effective for trapping undesired alkali metal ions, for example, Na+ which may be present in the composition itself or permeate in the packages made therefrom and also act to corrode the conductor. Preferred ion-exchange material for the epoxy resin encapsulating composition is found to be represented by the formula:

$SbBi_xO_y(OH)_z(NO_3)_w \cdot n(H_2O)$ in which x represents 0.2 to 2.0, y represent 1.0 to 5.0, z represents 0.1 to 3.0, w represents 0.1 to 3.0 and n represents 0.5 to 3.0.

10 Claims, No Drawings

EPOXY RESIN ENCAPSULATING COMPOSITION WITH ENHANCED MOISTURE RESISTANCE AND METHOD FOR PRODUCING THE SAME

BACKGROUND OF THE INVENTION

1. Field of the Invention

The present invention is directed to an epoxy resin encapsulating composition with enhanced moisture resistance for semiconductor packages and the method for producing the same. More particularly, the present invention is directed to such an epoxy resin encapsulating composition which includes an inorganic ion-exchange solid material for trapping particularly the chlorine ions originating from an epichlorohydrin forming the epoxy resin and inherently present in the epoxy resin.

2. Description of the Prior Art

In recent years, there has been a growing demand for miniaturizing semiconductor packages in the form of, for example, a small outline package (SOP) and a flat package (FP) which are capable of being directly mounted on a circuit board with external solder dip leads thereof being soldered to the circuit board. In this direct mounting process, it is a standard industry practice to dip entire package in a soldering bath and then place it on the circuit board for simultaneous soldering of the external leads to the corresponding lands on the circuit board. Due to this recent industry demand of dipping the entire package in the soldering bath prior to the mounting thereof, increasing emphasis is being placed on adding enhanced moisture resistance to an epoxy resin encapsulating composition for the semiconductor packages, or on utilizing the epoxy resin encapsulating composition which has an enhanced moisture resistance which remains intact even when it is dipped in the soldering bath to be subjected to intense heat and vapor of the solder. Such enhanced moisture resistance is also required for the packages which are exposed in the actual operating condition to an elevated temperature environment.

In the meanwhile, it is known that epoxy resins made from epichlorohydrin and an aromatic hydroxyl-containing compound inevitably contain a certain amount of undesirable by-products in which the chlorines of the epichlorohydrin are coupled with certain epoxy groups of the resulting epoxy resin. This undesirable by-product is very likely to be hydrolyzed when exposed to heat in the presence of moisture into the chlorine ions which show strong corrosive action as reacted with the moisture, eventually corrode the metallic conductor of the semiconductor such as aluminum conductor so as to damage the semiconductors or reduce the moisture resistance of the package thereof. In order to avoid such unacceptable reduction in the moisture resistance, there have been attempted to reduce the amount of the by-product contained in the epoxy resin adduct. However, this approach involves complicated and difficult treatments which are not practically acceptable and do not assure complete removal of the undesired by-product. In this respect, the remaining by-product will act to lower the moisture resistance as it is hydrolyzed into the corrosion inducing ions when the package or epoxy resin encapsulating composition is subjected to heat and moisture at the soldering process or in a high temperature operating environment. Further, there is another problem that the package when subjected to soldering process will suffers from the permeation of the chlorine ions $Cl^-$ possibly contained in a flux employed in the soldering through a minute gap developed between the external leads and the molded composition due to the heat stress applied thereto at the time of the soldering process. To this end, it is desirable to utilize a suitable ion exchanger which is capable of trapping the corrosion-inducing ions occurring in the packages after the encapsulation from the standpoint of successfully preventing the lowering of the moisture resistance due to such undesirable ions.

SUMMARY OF THE INVENTION

Through extensive study on the compatibility of the ion exchangers with the epoxy resin encapsulating composition, the inventors find a most advantageous ion exchanger which greatly improves the moisture resistance of the epoxy resin encapsulating composition while retaining the advantageous characteristics thereof. Most common ion-exchangers known as ion-exchange resins are firstly examined but found unacceptable since they are not expected to withstand the heat shock caused at the time of soldering, loosing the intended ion-exchange capacity. Upon this recognition, the inventors have examined several inorganic ion-exchange solid materials which retain the ion-exchange capacity at an elevated temperature and found that specific type of the inorganic ion-exchange solid material has superior effect to improve the moisture resistance even when it is exposed to a high temperature environment. The inorganic ion-exchange solid material to be found effective is characterized to include antimony and bismuth as basic materials forming an ion-exchange network which carries mobile anions to be substituted with the undesired chlorine ions $Cl^-$. This ion-exchange material with superior stability against the heat is prepared in the form of particles and admixed with an epoxy resin adduct of epichlorohydrin and an aromatic hydroxyl-containing compound to produce the epoxy resin encapsulating composition. Although the reason and mechanism are not clear, this particular inorganic ion-exchange solid material shows remarkable capacity of trapping and stably holding the undesired chlorine ions $Cl^-$ on its network, thus preventing them from reacting with the moisture present in the encapsulating composition and acting to corrode the aluminum conductor in the semiconductor package. Such undesirable chlorine ions $Cl^-$, in addition to being resulted form the corresponding chloride with the certain epoxy groups in the epoxy resin itself, may enter from outside of the package as they permeate from a flux employed for the soldering process through a minute gap between the external leads of the package and the molded composition of the package, such gap being developed at the soldering due to the difference in expansion coeffiecent between the leads and the molding material. The above inorganic ion-exchange material is equally possible to effectively trap the chlorine ions $Cl^-$ entering the package from the outside thereof. Like halogen ions such as bromine ions $Br^-$, which may be present in the epoxy resin composition as a result of brominating the epoxy resin for a flame retardation purpose, can be effectively trapped by the inorganic ion-exchange material so as to be prevented from acting to corrode the aluminum conductor, as in the case of the chlorine ions $Cl^-$.

Accordingly, it is a primary object of the present invention to provide an epoxy resin encapsulating composition with enhanced moisture resistance for semiconductor packages which is capable of trapping the undesired chlorine ions Cl⁻ and like halogen ions occurring after the encapsulation, successfully protecting the metallic conductor of the semiconductor encapsulated in the package from being corroded by the action of the undesired ions.

The above inorganic ion-exchange material is represented by the general formula:

$$SbBi_xO_y(OH)_z(NO_3)_w \cdot n(H_2O)$$

in which x represents 0.2 to 2.0, y represent 1.0 to 5.0, z represents 0.1 to 3.0, w represents 0.1 to 3.0 and n represents 0.5 to 3.0.

The ion-exchange material is found to be also effective in trapping alkali metal ions which are very likely to the present in the encapsulating composition itself as a result of reacting the epichlorohydrin and the aromatic hydroxyl-containing compound in the presence of an alkali metal containing catalyst and/or as a result of that they enter as unavoidable impurities attendant with silica to be incorporated as a filler in the composition. Such alkali metal ion includes sodium ion Na⁺, potassium ion K⁺ which are also the cause of corroding the metallic conductor in the package in the presence of moisture and therefore should be removed therefrom for improving the moisture resistance. In this respect, the above ion-exchange material acts not only as anion exchanger but also as cation exchanger. This behavior of the ion-exchange material is thought to be attributed to the hydroxyl groups (OH)⁻ contained therein as mobile groups with respect to the network molecules. That is, the hydroxyl group (OH)⁻ acts as anion exchanger on one hand to replace for the halogen ion, for example, chlorine ion Cl⁻ in the following process:

$$(+)(OH)^- + Cl^- \rightarrow (+)Cl^- + OH^-,$$

in which (+) represents a positive site on the ion-exchange material. And the hydroxyl group (OH)⁻ acts as cation exchanger on the other hand to replace for alkali ions, for example, sodium ion Na+ in the following process:

$$(+)(OH)^- + Na^+ \rightarrow (+)ONa + H^+.$$

The Cl⁻ and O-Na⁻ ions thus trapped on the positive site of the ion-exchange material form respectively therewith very stable substances which are hardly decomposed to again liberate the trapped ions.

It is therefore another object of the present invention to provide an epoxy resin encapsulating composition with enhanced moisture resistance for semiconductor packages which is capable of trapping not only the halogen ions but also alkali metal ions which may be present in the encapsulating composition and likewise harmful to the metallic conductor in the package.

In accordance with a preferred aspect of the present invention, 0.1 to 10 parts by weight of the ion-exchange material is mixed with 100 parts by weight of the epoxy resin adduct. The ion-exchange material added in an amount less than the lower limit is found to be less effective for the intended improvement of the moisture resistance, and is found not to drastically improve the moisture resistance in proportion to the amount to be added and is rather thought to reduce the physical properties or handling characteristics of the composition when added in excess amount above the upper limit.

The present invention further discloses an advantageous method of producing the epoxy resin encapsulating composition in which a large volume of water is mixed together with the particles of the ion-exchange material into the molten epoxy resin adduct in order to positively hydrolyze the chloride attached to the epoxy group of the epoxy resin into the chlorine ion prior to preparing the final encapsulating composition product. With this technique, the chorine ion coupled to the epoxy group of the epoxy resin adduct can be readily liberated or hydrolyzed for ensuring efficient trapping by the ion-exchange material dispersed in the adduct, which is therefore a further object of the present invention.

These and other objects of the present invention will be more apparent from the following detailed description of the embodiments.

DETAILED DESCRIPTION OF THE INVENTION

A novel epoxy resin encapsulating composition with enhanced moisture resistance for semiconductor packages in accordance with the present invention consists essentially of the admixture of an epoxy resin adduct of epichlorohydrin and an aromatic hydroxyl-containing compound, and an inorganic ion-exchange solid material in the form of particles dispersed in the epoxy resin adduct. The ion-exchange solid material is characterized to include antimony and bismuth as basic materials and is represented by the following formula:

$$SbBi_xO_y(OH)_z(NO_3)_w \cdot n(H_2O)$$

in which x represents 0.2 to 2.0, y represent 1.0 to 5.0, z represents 0.1 to 3.0, w represents 0.1 to 3.0 and n represents 0.5 to 3.0.

Also incorporated in the admixture are a curing agent, cure accelerator, flame retardant, filler, and mold release agent. Preparation of the above composition can be made with any known procedures, for example, by blending the suitable amounts of the ingredients of the composition in a suitable rotary mixer followed by kneading the resultant admixture, cooling it and thereafter grinding it to powder.

The epoxy resin applicable to the present invention can be selected from any normally used epoxy resins which are widely utilized to formulate the conventional molding compositions including cresol novolac, phenol novolac, and the like. Preferably, ortho-cresol novolac is utilized to obtain satisfactory moisture resistance which have epoxy equivalent weights of 180 to 220.

The curing agent for the epoxy resin is also well known in the art and can be selected solely or in combination from the group consisting of amines; acid anhydrides such as maleic anhydride, succinic anhydride, phthalic anhydride, tetrahydrophtalic anhydride; and novolac type phenol resins such as phenol novolacs, cresol novolacs, tert-butyle phenol novolacs, and nonyl phenol novolacs. In view of improving the moisture-proof and molding characteristics, a preferred curing agent for the epoxy resins is found to be phenol novolacs or the combination of phenol novolacs and acid anhydrides.

The cure accelerator which may be optionally employed comprise one or more of the conventional accelerator such as imidazoles, 1.8-diaza-bicyclo(5,4,0) undecene, salts thereof, and organic phosphines. Included in the imidazoles are, for example, 2-undecyl imidazole, 2-methyl imidazole, 1-cyanoethyl-2-ethyl-4-methyl imidazole, 2-phenyl imidazole, and 2-heptadecyl imidazole. Included in the salts of 1.8-diaza-bicyclo(5,4,0) undecene are those with phenoles, 2-ethylhexanoic acid, oleic acid, and acid carbonates.

The flame retardants includes, for example, brominated epoxy resin, chlorinated paraffin, bromotoluene, hexabromobenzene, and antimony trioxide.

Suitable fillers for the epoxy resin encapsulating composition are well known to be inorganic fillers such as fused silica powder, quartz glass powder, glass fiber, talc, alumina powder, calcium silicate powder, calcium carbonate powder, and barium sulfate powder. One or more kinds of the above fillers can be utilized in the present invention, and preferably fused silica powder is selected as exhibiting inherent low coefficient of heat expansion. The amount of such fillers to be incorporated will vary depending upon the kinds of the epoxy resins, curing agents, and the fillers employed. The size of the silica powder may be optionally chosen in such a manner as to improve the molding characteristics. Preferably, the silica powder is selected to have an average particle size of 10 to 30 $\mu$.

Similarly, suitable mold release agents applicable to the present encapsulating composition include carnauba wax, and like natural or synthetic wax, metallic salts of straight-chain fatty acids, acid amides, and esters.

The epoxy resin encapsulating composition may additionally include colorants such as carbon black and silane coupling agents.

The above inorganic ion-exchange material employed in the present invention has a stable ion-exchange capacity at a temperature up to 400° C. or more, which is much higher than the melting point of the epoxy resin as well as the temperature at which the package is soldered to a circuit board in an automated manner as to firstly dipping it in a soldering bath and placing it on the board. With this excellent stability against elevated temperature environments the ion-exchange material can successfully trap undesired ions which occur in the package or the encapsulating composition when exposed to the elevated temperature environments.

By the undesired ions, herein are meant ions which, in the presence of moisture, are very liable to corrode a metallic conductor, for example, aluminum conductor of the semiconductor to be encapsulated by the composition. The undesired ions includes halogen ions such as chlorine ions $Cl^-$ and bromine ions $Br^-$, and alkali metal ions such as sodium ion $Na^+$ and potassium ion $K^+$.

The chlorine ions $Cl^-$ originate from the epichlorohydrin forming the exposy resin and from a flux used for soldering the package. In fact, there are invevitably seen in the epoxy resin forming reaction that some chlorines of the epichlorohydrin are coupled with certain epoxy groups of the resulting epoxy resin which are readily hydrolized to liberate the chlorine ions $Cl^-$ in situ when exposed to an elevated temperature environment or subjected to heat shock as applied, for example, at the time of dipping the package in the soldering bath prior to the soldering and in a high temperature operating condition.

The bromine ions $Br^-$ originate from the brominated compound, for example, brominated epoxy resin incorporated in the encapsulating composition for a flame retardation purpose.

The sodium ions $Na^+$ and potassium ions $K^+$ may be present in the composition as originating from a corresponding alkali metal containing catalyst in the presence of which the epoxy resin is formed and/or may enter the composition as unavoidable impurities attendant with the silica particles to be incorporated in the composition.

These undesired ions are trapped by the ion-exhange material of which hydroxyl groups $(OH)^-$ bonded to the positive site of the network thereof function as anion as well as cation exchanger as described hereinbefore.

Although the exact reason is not clear, the nitrate ion $NO_3$ contained in the ion-exchange material is thought to act in association with hydroxyl group $(OH)^-$ to enhance the ion-exchange capability and ion-exchanging rate thereof.

In addition to this advantageous function, the ion-exchange material as defined in the above exhibits a superior characteristic that it firmly captures on the network thereof the undesired ions once trapped so as to prevent them from converting back into the liberated ions.

The above superior characteristic is not expected from a conventional inorganic absorbent such as a metal oxides including as its basic constituents magnesium and aluminum, although it is known to capture the undesired ions to some extent.

The ion-exchange material is admixed to the other ingredients in the form of particles to be uniformly dispersed in the composition. In this respect, the ion-exchange material is selected to preferably have an average particle size of not greater than 5 $\mu$ and a maximum particle size of not greater than 100$\mu$. When the average particle size is greater than 5$\mu$, the ion-exchange capacity is not expected to increase in proportion to the increasing amount to be added. And when the maximum particle size is greater than 100 $\mu$, the ion-exchange capacity is lowered with the decreasing specific surface area of the particle, in addition to that such greater particles are the cause of failing to uniformly disperse the particles in the composition, thus reducing the molding characteristic. In this connection, the maximum particle size of the ion-exchange material is preferably selected to be less than the average particle size of the silica incorporated in the composition as a filler in order to facilitate the uniform dispersion in the composition containing the silica particles.

The present invention is further illustrated by way of the following Examples without being limited thereto and is evaluated through several test in comparison with the comparative examples. Firstly, tests were made for confirming the ion-exchange capability for several ion-exchange materials per se. The tested materials, as listed in Table 1, include those [A to I] characterized to contain antimony and bismuth as basic materials forming an ion-exchange network, a conventional ion-exchange resin [J] made of polystyrene having amino groups as ion-exchangeable anions, and inorganic absorbent material [K] of metal oxides containing as its basic constituents magnesium and aluminum. The tests were made with respect to:

(#1) ion-exchange capacity at 121° C.; and (#2) ion-exchange capacity at 121° C. after being subjected to an elevated temperature of 350° C. for 2 hours, which was intended to simulate the heat shock which will be applied to the materials when incorporated in the encapsulating composition.

The ion-exchange capacity #1) of each material in Table 1 represents the amount of chlorine ions $Cl^-$ remaining in water solution as being untrapped by the material. For this measurement, each ion-exchange or absorbent material was mixed in a 100 ml of water solution containing chlorine ion $Cl^-$ in an amount of 100 ppm per unit gram of the material. The resulting water solution was heated to a temperature of 121° C. for 20 hours and was thereafter measured by the ion-chromatograph analysis the amount [ppm] of the remaining ions present in the solution as being untrapped by the ion-exchange or absorbent material.

The ion-exchange capacity (#2) of each material was measured in the same manner except that it was exposed to an elevated temperature of 350° C. for 2 hours prior to be mixed in the water solution containing the prescribed amount of the chlorine ion $Cl^-$.

In the following Table 2, Examples 1 to 15 and comparative examples 1 to 3 show the comparative results with and without the use of the individual ion-exchange or absorbent material listed in Table 1 for formulating corresponding epoxy resin encapsulation compositions.

Each of the ion-exchange or absorbent materials (A to K) of Table 1 was admixed in the listed amount in Table 2 with the following ingredients to formulate the individual epoxy resin encapsulating composition (Examples 1 to 15, and comparative examples 1 to 3), all parts by weight:

160 parts of epoxy resin adduct of epichlorohydrin and ortho-cresole novolac [epoxy equivalent weight 195, softening point 75° C.];

90 parts of phenol novolac as curing agent [molecular weight 700, hydroxyl equivalent weight 700];

3 parts of 2-undecyl imidazole as cure accelerating agent;

20 parts of brominated epoxy resin as flame retardant [epoxy equivalent weight 250, softening point 90° C.];

30 parts of antimony trioxide as flame retardant;

4 parts of carnauba was as mold release agent; 4 parts of carbon black as coloring agent; and 640 parts of fused silica as filler [average particle size $20\mu$]

The resultant formulation of each composition was admixed to be thoroughly blended and kneaded while being heated to form a sheet product. The sheet product was then cooled to a room temperature and was ground to powder having a maximum particle size of 0.1 to 0.4 mm for preparing sample composition in powder form.

For evaluation of the individual sample compositions, tests were made for each sample with respect to:

(#3) extract water analysis for evaluation of ion-exchange capacity; and (#4) moisture resistance.

With the extract water analysis (#3), the ion-exchange capacity of each sample is evaluated in terms of

TABLE 1

| | average particle size [$\mu$] | ion-exchange capacity at 121° C. [ppm] #1 | ion-exchange capacity at 121° C. after exposure to 350° C. for 2 hours [ppm] #2 |
|---|---|---|---|
| A | $SbBi_{0.6}O_{3.1}(OH)_{0.4}(NO_3)_{0.2}.1H_2O$ | 3 | 5 | 5 |
| B | $SbBi_{0.2}O_3(OH)_{0.4}(NO_3)_{0.2}.1H_2O$ | 2 | 4 | 4 |
| C | $SbBi_{1.5}O_3(OH)_{0.4}(NO_3)_{0.2}.1H_2O$ | 1 | 4 | 4 |
| D | $SbBi_{0.6}O_5(OH)_{0.4}(NO_3)_{0.2}.1H_2O$ | 1 | 3 | 3 |
| E | $SbBi_{0.6}O_3(OH)_{2.0}(NO_3)_{0.2}.1H_2O$ | 1 | 2 | 2 |
| F | $SbBi_{0.6}O_3(OH)_{0.4}(NO_3)_{2.0}.1H_2O$ | 2 | 3 | 3 |
| G | $SbBi_{0.6}O_3(OH)_{0.4}(NO_3)_{0.4}.2H_2O$ | 2 | 4 | 4 |
| H | $SbBi_{0.6}O_3(OH)_{0.4}(NO_3)_{0.2}.1H_2O$ | 10 | 20 | 20 |
| I | $SbBi_{0.6}O_3(OH)_{0.4}(NO_3)_{0.4}.1H_2O$ | 2 | 5 | 10 |
| J | ION EXCHANGE RESIN *1 | 4 | 100 | 100 |
| K | $Mg_6Al_2(OH)_{16}CO_3.4H_2O$ | 4 | 80 | 93 |

TABLE 2

| | EXAMPLES | | | | | | | | | | | | | | | COMPARATIVE EXAMPLES | | |
|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 1 | 2 | 3 |
| ION-EXHANGER OR ABSORBENT USED | A | A | A | D | D | D | E | F | G | B | C | A | A | H | I | NONE | J | K |
| ADDED AMOUNT OF ION-EXCHANGER OR ABSORBENT parts | 0.2 | 3.0 | 8.0 | 0.2 | 4.0 | 9.0 | 1.0 | 1.0 | 1.0 | 1.0 | 1.0 | 0.05 | 12.0 | 1.0 | 1.0 | NONE | 1.0 | 1.0 |
| EXTRACT WATER #3 ANALYSIS Na+ ppm | 35 | 10 | 4 | 35 | 10 | 2 | 17 | 21 | 22 | 20 | 19 | 39 | 2 | 35 | 30 | 45 | 45 | 40 |
| Cl− ppm | 3 | 2 | <1 | 3 | 2 | <1 | 2 | 2 | 2 | 1 | 2 | 4 | <1 | 4 | 2 | 5 | 5 | 5 |
| MOISTURE #4 RESISTANCE hrs | 130 | 180 | 250 | 120 | 185 | 275 | 160 | 150 | 155 | 160 | 165 | 70 | 225 | 65 | 70 | 50 | 30 | 35 | the amount of the remaining ions Cl⁻ and Na⁺ left in the sample as a result of not being trapped by the ion-exchange material or absorbent contained in the sample composition. This test was made according to the following procedure. Each sample powder was heated at a temperature of 175° C. for 5 hours to be completely cured. Then, the cured composition was ground to a particle size which passes through a 200 mesh screen powder. Subsequently, 5 g of the resulting minute sample particle or powder was placed in a flask together with 46 g of deionized water and with 4 g of methanol, which mixture was heated to a temperature 151° C. for 100 hours.

Thereafter, the aqueous mixture was extracted and was measured of the amount of Cl⁻ and Na⁺ ions left untrapped by ion-chromatograpy analysis. The measured amounts are listed in Table 2 in ppm.

For evaluation of the moisture resistance (#4), each sample powder was processed by transfer molding at 175° C. at an injection pressure of 70 Kg/cm² in 90 sec. to provide a sample package which was a small outline 18-lead semiconductor package [SOP] encapsulating a 2.3×3.2 mm semiconductor chip with a comb pattern aluminum conductor of 5 μ width formed thereon. The resulting package was after-cured at 175° C. for 5 hours followed by being dipped for 10 seconds in a soldering bath maintained at 260° C. after machining the solder dip leads into suitable shape for a subsequent automated soldering process on a circuit board. In the next step, a suitable number of the same sample packages thus treated were subjected to a pressure cooker test [PCT] at 151° C., 5 atmospheric pressures, and a relative humidity [RH] of 100% for different time intervals in order to determine the moisture resistance in terms of the elapsed time required to induce the corrosion of the aluminum conductor in 50% of the sample packages subjected to the pressure cooker test. Such corrosion is determined by the occurrence of open-circuit in the comb pattern aluminum conductor which was inspected by the use of a multi-pin electric metering device.

CONCLUSIONS (1) It is apparent from the results of Table 1, that the conventional ion-exchange and absorbent materials (J,K) will completely or substantially lose their ion-exchange capacity after being heat treated only at an elevated temperature of 121° C. and are therefore not expected to trap the undesired ions such as Cl⁻ and Na⁺ inherent to the epoxy encapsulating composition which will occur at an elevated temperature of 121° C. or more, as confirmed from the results of Table 2 in which the moisture resistances of the packages (comparative examples 2 and 3) are lowered even as compared to the package without the ion-exchange material (comparative example 1).

(2) In contrast to the above, the ion-exchange materials (A to I) exhibit an excellent ion-exchange capacity at the elevated temperature of 121° C. and retain this capacity even after being exposed to a further elevated temperature, say 350° C., as apparent from the results of Table 1. In fact, each of the packages (Examples 1 to 15) obtained from the encapsulating composition including such materials exhibits an improved ion-exchange capacity as well as moisture resistance, as apparent from the results of Table 2.

(3) Most remarkable results with respect to the moisture resistance are obtained with the packages (Examples 1 to 10, and 14), accordingly the encapsulating compositions thereof are most preferable for semiconductor packages requiring improved moisture resistance. Although the package (Example 14) shows the best result with respect to the moisture resistance with incorporation of a larger amount, say 12 parts, of the ion-exchange material (A), the addition of too much material may lead to lowering of the molding characteristics. In this connection, the addition of small amount, say 0.05 parts, of the ion-exchange material (Example 12) is not expected to drastically improve the moisture resistance, although it is within an acceptable level.

Accordingly, the ion-exchange material is preferably added in the range of 0.05 to 12 parts to the epoxy resin composition formulated in the prescribed amount as listed hereinabove. Further, as seen from the results of Table 2, the moisture resistances of the packages (Examples 14 and 15 is rather lowered although within the acceptable level when the average particle size of the ion-exchange material is increased or when the proportion of particular component constituting the ion-exchange material is outside of the preferred range. All of the above demonstrate the superiority of the present invention which satisfies enhanced moisture resistance for semiconductor packages.

In addition, there is another method of producing the epoxy resin encapsulating composition which is advantageous for further improving the moisture resistance. This method comprises the steps of mixing the particles of the ion-exchange material into the molten epoxy resin to provide a first mixture, kneading the resulting first mixture so as to disperse the particles of the ion-exchange material uniformly into the epoxy resin, cooling the first mixture to solidify, milling the solidified first mixture to the corresponding powder, blending a curing agent for the epoxy resin with the powder of the first mixture to provide a second mixture, heating the second mixture to melt for partially curing of the epoxy resin, cooling the second mixture to solidify, and grinding the solidified second mixture to produce the encapsulation composition in powder. At the step of providing the first mixture, a large volume of deionized water is mixed together with the particles of the ion-exchange material into the molten epoxy resin in order to positively hydrolyze the chloride attached to the molecules of the epoxy resin into the chlorine ion and at the same time to trap the same ions on the network of the ion-exchange material by exchanging the mobile anions on the network with the chlorine ions in the water solution. The ion-exchange material is mixed in excess amount relative to the chlorine ions to be removed so as to enable sufficient amount of the mobile anion remaining on the network for another ion-exchange reaction in a later stage. The resulting first mixture is dewatered prior to milling the solidified first mixture. With this method, it is possible to reduce the amount of the undesired chlorine ion to a considerable extent.

What is claimed is:

1. An epoxy resin encapsulating composition with enhanced moisture resistance for semiconductor packages consisting essentially of the admixture of an epoxy resin adduct of epichlorohydrin and an aromatic hydroxyl-containing compound, and an inorganic ion-exchange solid material, said ion-exchange solid material being in the form of particles dispersed in the epoxy resin adduct and capable of exchanging its mobile anions with the chlorine ions which originate from the epichlorohydrin and occur in the epoxy resin adduct as a result of possible hydrolysis of the corresponding chlorides, said ion-exchange solid material being represented by the general formula:

$$SbBi_xO_y(OH)_z(NO_3)_w \cdot n(H_2O)$$

in which x represents 0.2 to 2.0, y represent 1.0 to 5.0, z represents 0.1 to 3.0, w represents 0.1 to 3.0 and n represents 0.5 to 3.0 and forming an ion-exchange network which carries said mobile anions to be substituted with said chlorine ions.

2. An epoxy resin encapsulating composition as set forth in claim 1, wherein said mobile anion is hydroxyl group of which hydrogen acts as cation to be substituted with possible alkali metal ions present in the epoxy resin adduct.

3. An epoxy resin encapsulating composition as set forth in claim wherein 0.1 to 10 parts by weight of said ion-exchange material is mixed with 100 parts by weight of the epoxy resin adduct.

4. An epoxy resin encapsulating composition as set forth in claim 1, wherein said ion-exchange solid material having an average particle size of not more than 5 $\mu$ and having a maximum particle size of not more than 100$\mu$.

5. A method of preparing an epoxy resin encapsulating composition with enhanced moisture resistance for semiconductor packages utilizing an epoxy resin adduct of epichlorohydrin and an aromatic hydroxyl-containing compound, and an inorganic ion-exchange solid material, said ion-exchange solid material being in the form of particles dispersed in the epoxy resin adduct and and capable of exchanging its mobile anions with the chlorine ions which originate from the epichlorohydrin and occur in the epoxy resin adduct as a result of possible hydrolysis of the corresponding chlorides, and said ion-exchange material being represented by the general formula:

$$SbBi_xO_y(OH)_z(NO_3)_w \cdot n(H_2O)$$

in which x represents 0.2 to 2.0, y represent 1.0 to 5.0, z represents 0.1 to 3.0, w represents 0.1 to 3.0 and n represents 0.5 to 3.0, said method comprising the steps of:
mixing the particles of said ion-exchange material into the molten epoxy resin to provide a first mixture;
kneading the resulting first mixture so as to disperse the particles of the ion-exchange material uniformly into the epoxy resin;
cooling the first mixture to solidify;
milling the solidified first mixture to the corresponding powder;
blending a curing agent for the epoxy resin with the powder of the first mixture to provide a second mixture;
heating the second mixture to melt for partially curing of the epoxy resin;
cooling the second mixture to solidify; and
grinding the solidified second mixture to produce the encapsulation composition in powder.

6. A method of preparing an epoxy resin encapsulating composition as set forth in claim 5, wherein 0.1 to 10 parts by weight of said ion-exchange material is mixed with 100 parts by weight of the epoxy resin adduct.

7. A method of preparing an epoxy resin encapsulating composition as set forth in claim 5, wherein said ion-exchange solid material having an average particle size of not more than 5 $\mu$ and having a maximum particle size of not more than 100$\mu$.

8. A method of preparing an epoxy resin encapsulating composition as set forth in claim 5, wherein an silica filler particles are blended in the first mixture at the step of providing the second mixture, said ion-exchange material being selected to have a maximum particle size of not greater than that of silica filler particles.

9. A method of preparing an epoxy resin encapsulating composition as set forth in claim 5, wherein a large volume of water is mixed together with the particles of said ion-exchange material into the molten epoxy resin adduct at the step of providing the first mixture in order to positively hydrolyze the chloride attached to the molecules of the epoxy resin into the chlorine ion and at the same time to trap the same ions on the network of the ion-exchange material by exchanging the mobile anions on the network with the chlorine ions in the water solution, said ion-exchange material being mixed in excess amount relative to the chlorine ions to be removed for remaining sufficient amount of the mobile anion on the network for another ion-exchange reaction, the resulting first mixture being dewatered prior to milling the solidified first mixture.

10. A method of preparing an epoxy resin encapsulating composition as set forth in claim 8, wherein 0.01 to 10 parts by weight of ion-exchange material and 10 to 100 parts of water are mixed with 100 parts by weight of the epoxy resin.

* * * * *